(12) United States Patent
Berg et al.

(10) Patent No.: US 11,618,791 B2
(45) Date of Patent: Apr. 4, 2023

(54) SYSTEMS AND METHODS FOR PRODUCING A SUPPORTED CATALYST

(71) Applicant: ExxonMobil Chemical Patents Inc., Baytown, TX (US)

(72) Inventors: Brian R. Berg, Humble, TX (US); Handel D. Bennett, Houston, TX (US); Chi-I Kuo, Atascocita, TX (US); Robert L. Griffin, Houston, TX (US); Chelsey M. Broussard, Baytown, TX (US); Bruce J. Savatsky, Kingwood, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 281 days.

(21) Appl. No.: 17/078,691

(22) Filed: Oct. 23, 2020

(65) Prior Publication Data
US 2021/0155723 A1    May 27, 2021

Related U.S. Application Data

(60) Provisional application No. 62/940,474, filed on Nov. 26, 2019.

(51) Int. Cl.
*B01J 37/02* (2006.01)
*B01J 37/04* (2006.01)
*C08F 4/52* (2006.01)
*C08F 4/64* (2006.01)
*C08F 4/02* (2006.01)

(52) U.S. Cl.
CPC ............. *C08F 4/02* (2013.01); *B01J 37/0205* (2013.01); *C08F 4/52* (2013.01); *B01J 37/0201* (2013.01); *B01J 37/04* (2013.01)

(58) Field of Classification Search
CPC ........... B01J 37/0205; B01J 37/04; C08F 4/64
USPC ......................................................... 526/86
See application file for complete search history.

(56) References Cited

U.S. PATENT DOCUMENTS

| | | |
|---|---|---|
| 5,240,894 A | 8/1993 | Burkhardt et al. |
| 5,846,895 A | 12/1998 | Gila et al. |
| 5,939,348 A | 8/1999 | Mink et al. |
| 6,117,955 A * | 9/2000 | Agapiou ................. C08F 10/00 526/160 |
| 6,300,436 B1 * | 10/2001 | Agapiou ................. C08F 10/00 526/155 |
| 6,306,984 B1 | 10/2001 | Agapiou et al. |
| 6,391,819 B1 | 5/2002 | Agapiou et al. |
| 6,455,462 B2 | 9/2002 | Van Berge et al. |
| 6,472,342 B2 | 10/2002 | Agapiou et al. |
| 6,608,153 B2 | 8/2003 | Agapiou et al. |

(Continued)

FOREIGN PATENT DOCUMENTS

CN    104549557    11/2018

*Primary Examiner* — Rip A Lee
(74) *Attorney, Agent, or Firm* — ExxonMobil Chemical Patents Inc.—Law Department

(57) ABSTRACT

A method of producing a supported catalyst includes introducing a dissolved catalyst solution into a catalyst mix vessel, and after introducing the dissolved catalyst solution into the catalyst mix vessel, introducing a porous support material into the catalyst mix vessel. The catalyst mix vessel is then operated to contact the dissolved catalyst solution on the porous support material and thereby generate the supported catalyst, and the supported catalyst is discharged from the catalyst mix vessel.

20 Claims, 2 Drawing Sheets

(56) References Cited

U.S. PATENT DOCUMENTS

| | | | |
|---|---|---|---|
| 7,041,750 B1 * | 5/2006 | Covezzi | B01J 8/10 |
| | | | 526/86 |
| 7,354,880 B2 | 4/2008 | Agapiou et al. | |
| 7,906,597 B2 * | 3/2011 | Fouarge | B01J 8/0035 |
| | | | 526/919 |
| 9,512,254 B2 | 12/2016 | Hussein et al. | |
| 9,540,460 B2 * | 1/2017 | Lester | C08F 4/02 |
| 2002/0132944 A1 | 9/2002 | Agapiou et al. | |
| 2008/0214385 A1 | 9/2008 | Agapiou et al. | |
| 2018/0273655 A1 | 9/2018 | Kuo | |
| 2020/0071438 A1 * | 3/2020 | Brandl | C08F 210/16 |

\* cited by examiner

SYSTEMS AND METHODS FOR PRODUCING A SUPPORTED CATALYST

CROSS-REFERENCE TO RELATED APPLICATIONS

This application claims the benefit of U.S. Provisional Application No. 62/940,474, filed Nov. 26, 2019, entitled "Systems and Methods for Producing a Supported Catalyst", the entirety of which is incorporated by reference herein.

FIELD

The invention relates to a method of producing a supported catalyst.

BACKGROUND

Polyolefins are of great interest in industry as they have many uses in different areas. Polyolefins, such as polyethylene and polypropylene, for example, are used in everything from waxes and plasticizers to films and structural components.

A number of different types of catalysts have been developed for preparing polyolefins. The choice of catalyst may aid in tailoring various polyolefin properties, such as molecular weight, branching, tacticity, crystallinity, melt index, and similar features. Some catalysts suitable for polymerizing olefins are multi-site catalysts, such as the traditional Ziegler-Natta catalyst system (i.e., $TiCl_4$/triethylaluminum or $TiCl_3$/diethylaluminum chloride). Metallocene catalysts, in contrast, while mechanistically related to the traditional Ziegler-Natta catalyst system, are usually catalytically active at only a single site.

There remains a desire in the art for improved methods and systems for generating catalysts and supported catalysts used for the polymerization of olefins. Such improved methods and systems may help generate supported catalysts in larger batch quantities, which is also desirable.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure is generally related to systems and methods of fabricating a catalyst and, more specifically, systems and methods of increasing batch sizes of supported catalysts.

Supported catalysts that can be created using the systems and methods described herein are useful in many types of reactions, including polymerization processes, such as solution, slurry, and gas phase processes. For ease of understanding of the reader, as well as to place the various embodiments of the disclosure in context, much of the following description is presented for illustration in terms of systems and methods of fabricating supported metallocene catalysts, particularly on a commercial scale. However, this is done by way of non-limiting example only. Indeed, the presently disclosed systems and methods may be equally applied to produce various types of supported catalysts including, but not limited to, metallocene catalysts, Ziegler-Natta catalysts, and Co-based catalysts, Cr-based catalysts, Fe-based catalysts, Ni-based catalysts, Pd-based catalysts, Pt-based catalysts, Sc-based catalysts, Ti-based catalysts, V-Based catalysts, Y-based catalysts, and mixtures thereof. Moreover, the presently described systems and methods may prove advantageous in increasing batch sizes of supported catalyst production, without overloading the processing capabilities of existing catalyst mix vessels. As such, the systems and methods of the present disclosure may be implemented with minimal modifications to existing production lines.

Figure 1:
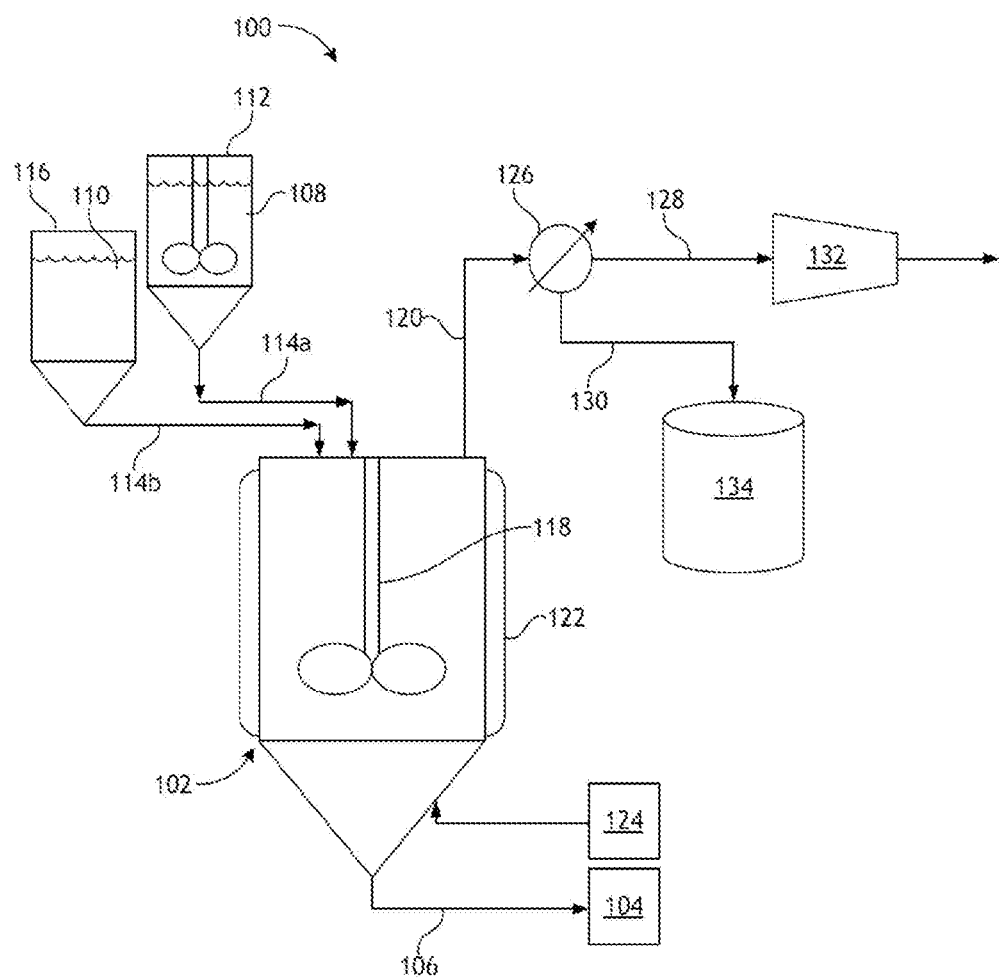
FIG. 1 is a schematic diagram of an example system for generating a supported catalyst, according to one or more embodiments of the present disclosure.

FIG. 1 is a schematic diagram of an example system 100 for generating a supported catalyst, according to one or more embodiments of the present disclosure. As illustrated, the system 100 may include a catalyst mix vessel 102 operable to receive and combine raw component materials, and subsequently discharge a supported catalyst 104 via a catalyst outlet line 106. In some embodiments, the supported catalyst 104 may then be used to make a polyolefin material, such as polyethylene or polypropylene.

The raw component materials used to make the supported catalyst 104 may include a dissolved catalyst solution 108 and a porous support material 110. The dissolved catalyst solution 108 may be contained within a pre-mix vessel 112 and conveyed to the catalyst mix vessel 102 in liquid form via a first inlet line 114a. The porous support material 110 may be contained within a solids container 116 and conveyed to the catalyst mix vessel 102 in solid form (e.g., powder, flakes, etc.) via a second inlet line 114b. Accordingly, the first and second inlet lines 114a and 114b may alternately be referred to as a "liquids stream" and a "solids stream," respectively. In at least one embodiment, however, the first and second inlet lines 114a and 114b may comprise a single inlet line fluidly coupled to the catalyst mix vessel 102, without departing from the scope of the disclosure.

The dissolved catalyst solution 108 may comprise one or more catalyst compounds (or components) and an activator dissolved in a solvent. In some embodiments, the catalyst compound may comprise a metallocene catalyst compound, and any of the metallocene catalyst compounds mentioned herein may be used, without departing from the scope of the disclosure. In some embodiments, the catalyst compound may be activated by an aluminoxane activator, such as methylaluminoxane (MAO). However, any of the activators mentioned herein may be used, without departing from the scope of the disclosure. The solvent may comprise an aliphatic or aromatic hydrocarbon and otherwise a material capable of dissolving or suspending the catalyst compound and the activator. Suitable solvents include, but are not limited to, hydrocarbons such as linear or branched alkanes including n-hexane, n-pentane and isopentane; aromatics such as benzene, toluene and xylene; cyclic structures such as cyclohexane, and halogenated hydrocarbons such as dichloromethane. Accordingly, in at least one embodiment, the dissolved catalyst solution 108 may comprise a metallocene solution activated by MAO and dissolved in toluene or another suitable solvent.

In some embodiments, the porous support material 110 may comprise silica, but may alternately comprise any of the other porous solid (carrier) materials mentioned herein. The porous support material 110 may be conveyed and introduced into the catalyst mix vessel 102 to be combined with the dissolved catalyst solution 108. In at least one embodiment, the porous support material 110 may be gas-conveyed or otherwise "blown" into the catalyst mix vessel 102 using a gas (e.g., nitrogen, helium, argon, neon, xenon, radon, etc.) injected into the second inlet line 114b. In other embodiments, however, the porous support material 110 may be conveyed into the catalyst mix vessel 102 using a materials auger, or the like. In yet other embodiments, the porous support material 110 may be manually introduced into the catalyst mix vessel 102, or by any combination of the foregoing, without departing from the scope of the disclosure.

The catalyst mix vessel 102 may include an agitator 118 operable to mix (combine) the dissolved catalyst solution 108 with the porous support material 110. Mixing the dissolved catalyst solution 108 with the porous support material 110 generates a catalyst slurry and helps fix the active catalytic components of the dissolved catalyst solution 108 into the pores of the porous support material 110. The agitator 118 may comprise any device or mechanism capable of mixing the dissolved catalyst solution 108 with the porous support material 110. In one embodiment, as illustrated, the agitator 118 may comprise a rotatable shaft with one or more paddles or baffles coupled thereto. In other embodiments, the agitator 118 may comprise a double-helical ribbon blender. In yet other embodiments, the agitator 118 may comprise a conical screw blender, which may include both an orbit arm and a screw for mixing. The agitator 118 may alternatively comprise a combination of the foregoing examples.

After the dissolved catalyst solution 108 has sufficiently mixed with the porous support material 110 in the catalyst mix vessel 102, the resulting catalyst slurry may then be dried within the catalyst mix vessel 102. In some embodiments, the catalyst slurry may be dried under vacuum with continuous or intermittent mechanical agitation. During the drying process, the solvent (e.g., toluene) is gradually converted to a vapor phase that may be continuously or intermittently removed from the catalyst mix vessel 102 via a gas outlet line 120. In other embodiments, or in addition thereto, the drying process may be enhanced by increasing the temperature of the catalyst mix vessel 102, such as through the use of a heating device 122. The heating device 122 may comprise, for example, a heating jacket disposed about the catalyst mix vessel 102 and designed to generate heat. Alternatively, the heating device 122 may comprise another type of heater or a heat exchanger. In yet other embodiments, or in addition thereto, a gas 124 may be injected into the catalyst mix vessel 102 to help agitate the catalyst slurry and thereby accelerate the drying process. The injected gas 124 may comprise, for example, nitrogen, which may also prove advantageous in helping to pull the solvent (e.g., toluene) into its gas phase.

The gas outlet line 120 may be communicably coupled to a condenser 126 that outputs a gas stream 128 and a liquid stream 130. The gas stream 128 may be conveyed to a compressor 132, which may convey the gas stream 128 to various downstream processes. In some applications, the compressor 132 may also generate the vacuum pressure that helps pull the gases from the catalyst mix vessel 102. The liquid stream 130 may substantially comprise the solvent (e.g., toluene) in liquid form to be received in a recovered liquids tank 134. The liquefied solvent may be recovered and recycled for subsequent use.

The dried supported catalyst 104 remaining in the catalyst mix vessel 102 may comprise the catalyst compound (e.g., metallocene) and activator (e.g., MAO) bound to (and within) the pores of the porous support material 110 (e.g., silica). This supported catalyst 104 may then be discharged from the catalyst mix vessel 102 via the catalyst outlet line 106 and subsequently used in reactors to make various types of materials, such as polyethylene.

In one example operation of the system 100, the porous support material 110 is first added to the catalyst mix vessel 102, and the dissolved catalyst solution 108 is subsequently and gradually introduced into the catalyst mix vessel 102 to be combined with the porous support material 110. This approach is referred to herein as a "solids first" approach, where a liquid solution is added to a solid (e.g., a powder) already present within the catalyst mix vessel 102.

During mixing within the catalyst mix vessel 102, it is desired to obtain good interaction between the dissolved catalyst solution 108 and the porous support material 110 such that the catalyst compounds become immobilized on/within the pores of the porous support material 110. Where there is inadequate contact between the solid and the liquid (dissolved) components, the resulting catalyst performance may be reduced. For example, if the liquid (dissolved) components do not make sufficient contact within the pores of the porous support material 110 and are instead primarily fixed to the exterior surface, then during subsequent use of the catalyst for polymerization particle growth ensues on the outer surface of the porous support material 110 and thereby closes off constituents positioned within the pores. Consequently, adequate contact between the solid and the liquid (dissolved) components is key to catalyst performance, and the solids first mixing approach has been shown to provide acceptable distribution of active catalyst components within silica particles.

The solids first mixing approach, however, limits the available batch size (i.e., quantity) of the supported catalyst 104 to a "standard" or "normal" batch size. As used herein, the term "batch size" refers to the quantity (mass) of supported catalyst 104 that can be produced (fabricated) from a single operational run of an existing catalyst mix vessel (e.g., the catalyst mix vessel 102). A "standard" or "normal" batch size refers to the mass of supported catalyst 104 that can be produced (fabricated) from standard volumes of the dissolved catalyst solution 108 and the porous support material 110. Using the solids first mixing approach, existing catalyst mix vessels (e.g., the catalyst mix vessel 102) may not be capable of adequately processing (mixing) the dissolved catalyst solution 108 and the porous support material 110 in amounts exceeding their standard volumes or masses, even though additional head space for receiving additional solids or liquids may remain in catalyst mix vessel 102.

More specifically, in the solids first approach, as the dissolved catalyst solution 108 is introduced into the catalyst mix vessel 102 and mixes with the porous support material 110, the mixture will progressively be wetted and proceed through a highly viscous mud phase, e.g., transitioning from a solid (e.g., powder) to a slurry mixture. Transitioning to the slurry mixture requires the agitator 118 to continuously drive materials through the mud phase until a less viscous slurry develops as more solvent from the dissolved catalyst solution is introduced. If the viscosity of the mud phase is high enough, the available torque produced by the agitator 118 may be insufficient and the power draw may be too high for the mixing load. Consequently, the batch size of the supported catalyst 104 that may be produced is generally limited by the load capacity of the agitator 118, and a single and standard operational run of the catalyst mix vessel 102 would include standard feed volumes intended not to exceed the operational limits of the agitator 118.

As an illustration, an example batch size for the supported catalyst 104 using solids first mixing in the catalyst mix vessel 102 may be about 1,200 lbs. To achieve this, the dissolved catalyst solution 108 and the porous support material 110 are added to the catalyst mix vessel 102 in standard feed volumes to ultimately generate 1,200 lbs. of dried supported catalyst 104. The standard feed volumes (amounts) are also sized not to exceed the operational limits of the agitator 118, thus enabling the agitator 118 to sufficiently mix the components through the high viscosity mud phase without failing or overloading. However, if it is desired to increase the batch size to, for instance, 1,600 lbs., solids first mixing of increased feed volumes (amounts) of the dissolved catalyst solution 108 and the porous support material 110 may cause the agitator 118 to fail since the agitator 118 may not be capable of driving the increased feed volumes through the highly viscous mud phase. To increase the catalyst batch size in such a scenario, the catalyst mix vessel 102 and/or the agitator 118 must be upgraded and/or replaced to handle the increased loading. As will be appreciated, however, this may be a costly and time-consuming undertaking and thus not feasible in most situations.

According to embodiments of the present disclosure, catalyst batch size in an existing catalyst mix vessel (e.g., the catalyst mix vessel 102) may be increased without causing an associated agitator (e.g., the agitator 118) to fail by altering when and/or how the dissolved catalyst solution 108 and the porous support material 110 are introduced into the catalyst mix vessel. In one or more embodiments, for example, the catalyst batch size in the existing catalyst mix vessel 102 may be increased by reversing the order of addition of the component parts of the supported catalyst 104. More particularly, the dissolved catalyst solution 108 may first be added (deposited) into the catalyst mix vessel 102 and, after the dissolved catalyst solution 108 is added, the porous support material 110 may be gradually introduced into the catalyst mix vessel 102 while the agitator 118 operates (mixes). This approach is referred to herein as a "liquid first" approach where a solid is added to a liquid solution already within the catalyst mix vessel 102.

By adding the liquid components first, the mixture within the catalyst mix vessel 102 transitions from a liquid solution directly to a slurry mixture as the porous support material 110 is progressively (gradually) added, thus avoiding the high viscosity mud phase. In other words, adding the dissolved catalyst solution 108 first and then introducing the porous support material 110 results in less resistance to agitation since the agitator 118 is not required to output an increased amount of torque to drive the mixture through the mud phase. Consequently, the feed volume (amounts) of the dissolved catalyst solution 108 and the porous support material 110 may be increased, which equates to an increased catalyst batch size in the existing catalyst mix vessel 102.

While the liquid first approach may prove advantageous in facilitating a larger catalyst batch size, in some instances this approach may also result in a maldistribution of catalyst compounds in the pores of the porous support material 110, which can lead to reduced catalyst performance (e.g., catalyst which produces a polymer that has higher fines content with a lower bulk density). More particularly, as the porous support material 110 is progressively added to and mixed with the dissolved catalyst solution 108 already within the catalyst mix vessel 102, the absorption of the dissolved catalyst solution 108 occurs practically instantaneously, thus individual solid particulates will not be immersed in (subjected to) the same concentration of the dissolved catalyst solution 108. Consequently, the amount of dissolved catalyst solution 108 that the individual solid particulates have available to immobilize becomes progressively less and less. This can result in maldistribution of the active components in the pores of the porous support material 110.

In some embodiments, carrying out a "hybrid" solids first and liquid first approach may avoid or mitigate maldistribution of catalyst compounds in the pores of the porous support material 110, while still resulting in an increase in the catalyst batch size. More specifically, in such embodiments, the dissolved catalyst solution 108 and the porous support material 110 may first be added to the catalyst mix vessel 102 via the solids first approach (i.e., liquid added to solid) and in corresponding feed volumes (amounts) sized to generate a normal (standard) catalyst batch size, as generally described above. Once the dissolved catalyst solution 108 and the porous support material 110 are sufficiently mixed with the agitator 118, which can handle transitioning through the mud phase with the first feed volumes, additional feed volumes (amounts) of the dissolved catalyst solution 108 and the porous support material 110 may be added to the catalyst mix vessel 102 via the liquid first approach (i.e., solid added to liquid) to generate a larger batch size. More specifically, a second amount of the dissolved catalyst solution 108 may first be added to the catalyst slurry already present in the catalyst mix vessel 102 followed by the gradual addition of a second amount of the porous support material 110 to mix with the second amount of the dissolved catalyst solution 108. The second amounts of the dissolved catalyst solution 108 and the porous support material 110 may be sized to increase the catalyst batch size from a regular (standard) batch size to a larger batch size.

As will be appreciated, the hybrid solids first and liquid first approach may prove advantageous in combining the benefits and advantages of each approach. For example, the solids first approach may advantageously result in good catalyst compound distribution, while the liquid first approach may advantageously result in less resistance to agitation by the agitator 118.

Variations of the hybrid solids first and liquid first approach described herein are also contemplated to avoid or otherwise mitigate maldistribution of catalyst compounds in the pores of the porous support material 110 while simultaneously increasing the catalyst batch size. In one or more embodiments, for example, the dissolved catalyst solution 108 and the porous support material 110 may first be added to the catalyst mix vessel 102 via the solids first approach (i.e., liquid added to solid). In such embodiments, the porous support material 110 may first be added in a feed volume (amount) sized to generate a normal (standard) catalyst batch size, but the dissolved catalyst solution 108 may subsequently be added in a volume (amount) sized to generate a large catalyst batch size. The resulting catalyst slurry will have a high concentration of the dissolved catalyst solution 108. Once the dissolved catalyst solution 108 and the porous support material 110 are sufficiently mixed with the agitator 118, an additional (second) feed volume (amount) of the porous support material 110 may be added to the catalyst mix vessel 102 via the liquid first approach (i.e., solid added to liquid) to generate a larger catalyst batch size. The second amount of the porous support material 110 may be gradually (progressively) added to the catalyst mix vessel 102 to mix with the catalyst slurry having the high concentration of the dissolved catalyst solution 108. The second amount of the porous support material 110 may be sized to increase the catalyst batch size from a regular batch size to a larger batch size.

In one or more additional embodiments, the dissolved catalyst solution 108 and the porous support material 110 may first be added to the catalyst mix vessel 102 via the liquid first approach (i.e., solid added to liquid). In such embodiments, the dissolved catalyst solution 108 may first be added in a feed volume (amount) sized to generate a normal (regular) catalyst batch size, and the porous support material 110 may be subsequently added to the dissolved catalyst solution 108 in a feed volume (amount) sized to generate the normal (regular) catalyst batch size. Once the dissolved catalyst solution 108 and the porous support material 110 are sufficiently mixed with the agitator 118, an additional (second) volume (amount) of the dissolved catalyst solution 108 may be added to the catalyst mix vessel 102, thus resulting in a catalyst slurry having a high concentration of the dissolved catalyst solution 108. An additional (second) volume (amount) of the porous support material 110 may then be gradually (progressively) added to the catalyst mix vessel 102 to mix with the catalyst slurry having the high concentration of the dissolved catalyst solution 108. The second amount of the porous support material 110 may be sized to increase the catalyst batch size from a regular batch size to a larger batch size.

In one or more additional embodiments, the dissolved catalyst solution 108 and the porous support material 110 may first be added to the catalyst mix vessel 102 via the liquid first approach (i.e., solid added to liquid). In such embodiments, the dissolved catalyst solution 108 may first be added in a feed volume (amount) sized to generate a normal (regular) catalyst batch size, and the porous support material 110 may be subsequently added to the dissolved catalyst solution 108 in a feed volume (amount) sized to generate the normal (regular) catalyst batch size. Once the dissolved catalyst solution 108 and the porous support material 110 are sufficiently mixed with the agitator 118, an additional (second) volume (amount) of the porous support material 110 may be added to the catalyst mix vessel 102 in an amount sized to increase the catalyst batch size from a regular batch size to a larger batch size. An additional (second) volume (amount) of the dissolved catalyst solution 108 may then be added to the catalyst mix vessel 102 to mix with the additional porous support material 110. The second amount of the dissolved catalyst solution 108 may be sized to increase the catalyst batch size from a regular batch size to a larger batch size.

In one or more additional embodiments, the dissolved catalyst solution 108 and the porous support material 110 may first be added to the catalyst mix vessel 102 via the solids first approach (i.e., liquid added to solid). In such embodiments, the porous support material 110 may first be added in a feed volume (amount) sized to generate a normal (regular) catalyst batch size, and the dissolved catalyst solution 108 may be subsequently added to the porous support material 110 in a feed volume (amount) sized to generate the normal (regular) catalyst batch size. Once the dissolved catalyst solution 108 and the porous support material 110 are sufficiently mixed with the agitator 118, an additional (second) volume (amount) of the porous support material 110 may be added to the catalyst mix vessel 102 in an amount sized to increase the catalyst batch size from a regular batch size to a larger batch size. An additional (second) volume (amount) of the dissolved catalyst solution 108 may subsequently be added to the catalyst mix vessel 102 to mix with the additional porous support material 110. The second amount of the dissolved catalyst solution 108 may be sized to increase the catalyst batch size from a regular batch size to a larger batch size.

For some or all of the embodiments described herein, the solid-to-liquid ratio may be about 2.9 mL of the dissolved catalyst solution 108 per each gram of the porous support material 110 (i.e., 2.9 mL/g). Alternatively, the solid-to-liquid ratio may be about 2.6 grams of the dissolved catalyst solution 108 per each gram of the porous support material 110 (i.e., 2.6 g/g). Mixtures of the dissolved catalyst solution 108 and the porous support material 110 may be maintained above these ratios to avoid potential caking out. As used herein, "caking out" occurs when the solution forms a hard cake, reacting like a solid chunk rather than a solution when mixing force is applied.

Figure 2:
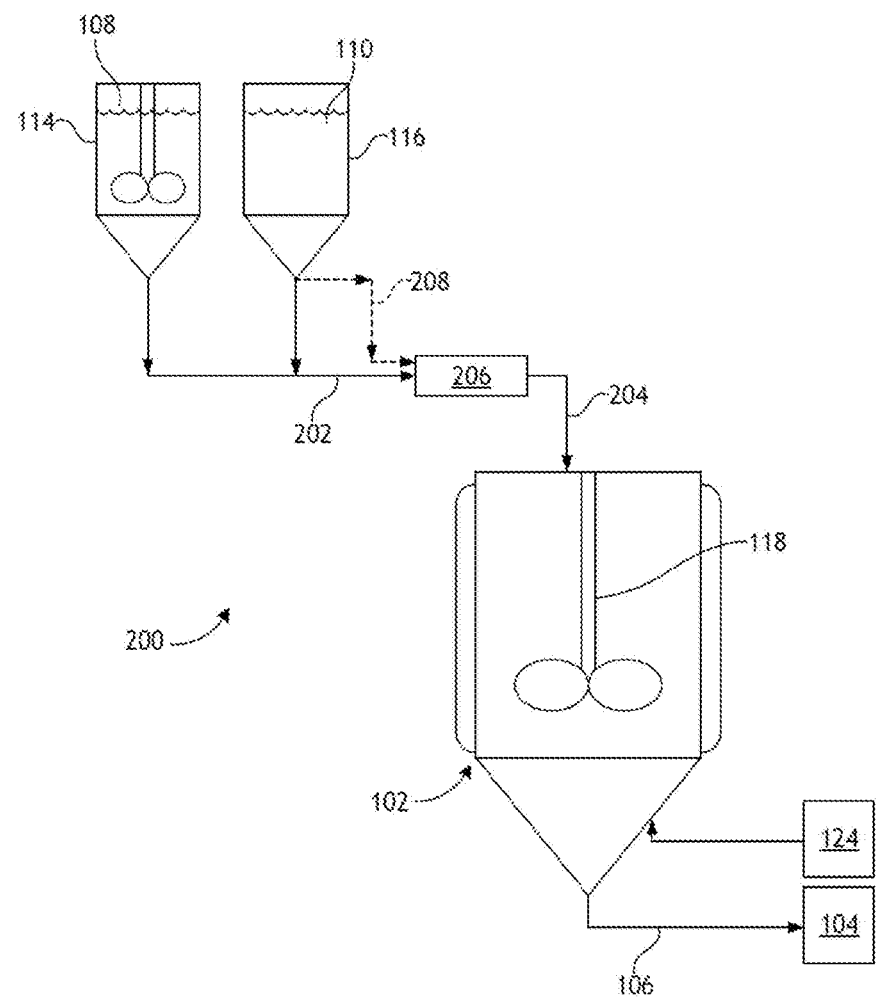
FIG. 2 is a schematic diagram of another example system for generating a supported catalyst, according to one or more additional embodiments.

FIG. 2 is a schematic diagram of another example system 200 for generating a supported catalyst, according to one or more embodiments of the present disclosure. The system 200 may be similar in some respects to the system 100 of FIG. 1 and therefore may be best understood with reference thereto, where like numerals will represent like elements not described again in detail. For example, similar to the system 100 of FIG. 1, the system 200 may include the catalyst mix vessel 102 operable to receive and combine the dissolved catalyst solution 108 and the porous support material 110 and subsequently discharge the supported catalyst 104 via the catalyst outlet line 106. Moreover, the gas 124 (e.g., nitrogen, air or carbon dioxide) may be injected into the catalyst mix vessel 102 to help accelerate the drying process, as described above. For the sake of simplicity, the condenser 126 (FIG. 1), the compressor 132 (FIG. 1), and the recovered liquids tank 134 (FIG. 1) are not shown in FIG. 2, but may be otherwise included in the system 200 to receive and process the gasified solvent, as generally described above.

Unlike the system 100 of FIG. 1, however, the dissolved catalyst solution 108 and the porous support material 110 may be individually fed into (or received by) a common inlet line 202 where they may be combined and otherwise mixed (e.g., pre-mixed) prior to being introduced into the catalyst mix vessel 102. Mixing the dissolved catalyst solution 108 and the porous support material 110 within the inlet line 202 may result in a pre-mixed slurry feed 204 being formed within the inlet line 202 and fed into the catalyst mix vessel 102. Within the catalyst mix vessel 102, the agitator 118 is operable to fully mix the dissolved catalyst solution 108 and the porous support material 110 and thereby achieve full contact between the solid and active catalyst compounds.

As discussed above, adequately mixing the solid and active catalyst compounds has proven to be a critical step in the catalyst manufacturing process. In the present embodiment, the dissolved catalyst solution 108 and the porous support material 110 are mixed (e.g., pre-mixed) in-line within the inlet line 202 on a smaller scale before entering the catalyst mix vessel 102 and being subjected to full mixing with the agitator 118. Pre-mixing the solid and active catalyst compounds allows for better control of the concentration of dissolved catalyst compounds (e.g., metallocene and the activator) to which every particle of the porous support material 110 is exposed, which may result in a more uniform distribution of the dissolved catalyst compounds on the porous support material 110. Moreover, creating the pre-mixed slurry feed 204 in the inlet line 202 may also prove advantageous in avoiding the limitations of the agitator 118. More specifically, creating the pre-mixed slurry feed 204 in the inlet line 202 may circumvent the need for the agitator 118 to fully transition the materials through the highly-viscous mud phase within the catalyst mix vessel 102. Consequently, the volume (amounts) of the dissolved catalyst solution 108 and the porous support material 110 may be increased, which equates to an increased catalyst batch size in the existing catalyst mix vessel 102.

In some embodiments, the dissolved catalyst solution 108 and the porous support material 110 are combined and pre-mixed within the inlet line 202 to form the pre-mixed slurry feed 204. Physical contact and interaction between the dissolved catalyst solution 108 and the porous support material 110 as they circulate through the inlet line 202 may result in the formation of the pre-mixed slurry feed 204. As discussed above, the dissolved catalyst solution 108 may be prepared in the pre-mix vessel 114 before being discharged into the inlet line 202. The porous support material 110 may be stored in the solids container 116 and fed into the inlet line 202 downstream from the dissolved catalyst solution 108. In one or more embodiments, the porous support material 110 may be gas conveyed or "blown" into the inlet line 202, such as through the injection of a gas (e.g., nitrogen). In other embodiments, the porous support material 110 may be gravity fed into the inlet line 202. In yet other embodiments, the porous support material 110 may be combined with a liquid diluent (e.g., toluene) within the solids container 116 to form a support slurry, and the support slurry may be pumped or gravity fed into the inlet line 202 to be combined with the dissolved catalyst solution 108.

In other embodiments, the system 200 may further include a mixing device 206 positioned (arranged) inline within the inlet line 202 and configured to receive and help pre-mix the solid and active catalyst compounds and output the pre-mixed slurry feed 204 to be received by the catalyst mix vessel 102. The mixing device 206 may comprise a passive or active mixing apparatus or system. In some embodiments, for example, the mixing device 206 may comprise a static mixer that includes a pipe with a fixed internal positioned therein to provide a tortuous circulation pathway. As the solid and active catalyst compounds circulate therethrough, they are intermixed and combined to form the pre-mixed slurry feed 204. In other embodiments, however, the mixing device 206 may comprise any type of mechanical, electrical, electromechanical, hydraulic, or pneumatic mixing system that may be activated to move one or more moving parts (e.g., an auger, a plurality of baffles, etc.) pre-mix the solid and active catalyst compounds and output the pre-mixed slurry feed 204.

The mixing device 206 helps improve contact between the solid and the active particles. In some embodiments, the dissolved catalyst solution 108 and the porous support material 110 may be first combined within the inlet line 202 and simultaneously enter the mixing device 206 via the inlet line 202. In such embodiments, a small amount of pre-mixing of the solid and active catalyst compounds may occur prior to being mixed further within the mixing device 206. In other embodiments, however, the dissolved catalyst solution 108 and the porous support material 110 may be individually introduced into the mixing device 206. In such embodiments, the porous support material 110 may be conveyed to the mixing device 206 via a solids line 208 extending from the solids container 116.

Catalyst Compounds

According to embodiments of the present disclosure, the dissolved catalyst solution 108 may comprise at least one metallocene catalyst compound (or component). The metallocene catalyst compounds described herein include "half sandwich" and "full sandwich" compounds having one or more Cp ligands (cyclopentadienyl and ligands isolobal to cyclopentadienyl) bound to at least one Group 3 to Group 12 metal atom, and one or more leaving group(s) bound to the at least one metal atom. The metallocene catalyst compound is supported on porous support material 110, and may be supported with, or without, another catalyst compound.

In a more particular exemplary embodiment, the Cp ligand(s) are selected from the group consisting of substituted and unsubstituted cyclopentadienyl ligands, substituted cyclopentadienyl ligands (e.g., pentaalkylcyclopentadienyl ligands) and ligands isolobal to cyclopentadienyl, non-limiting examples of which include cyclopentadienyl, indenyl, fluorenyl and other structures. Further non-limiting examples of such ligands include cyclopentaphenanthreneyl, benzindenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7H-dibenzofluorenyl, indeno[1,2-9]anthrene, thiophenoindenyl, thiophenofluorenyl, hydrogenated versions thereof (e.g., 4,5,6,7-tetrahydroindenyl, or "$H_4Ind$"), substituted versions thereof (as described in more detail below), and heterocyclic versions thereof.

The metal atom "M" of the metallocene catalyst compound may be selected from the group consisting of Groups 3 through 12 atoms and lanthanide Group atoms in one exemplary embodiment; and selected from the group consisting of Groups 3 through 10 atoms in a more particular exemplary embodiment, and selected from the group consisting of Sc, Ti, Zr, Hf, V, Nb, Ta, Mn, Re, Fe, Ru, Os, Co, Rh, Ir, and Ni in yet a more particular exemplary embodiment; and selected from the group consisting of Groups 4, 5 and 6 atoms in yet a more particular exemplary embodiment, and Ti, Zr, Hf atoms in yet a more particular exemplary embodiment, and Zr in yet a more particular exemplary embodiment. The oxidation state of the metal atom "M" may range from 0 to +7 in one exemplary embodiment; and in a more particular exemplary embodiment, may be +1, +2, +3, +4 or +5; and in yet a more particular exemplary embodiment may be +2, +3 or +4. The Cp ligand(s) a haptic chemical bond with the metal atom M to form the metallocene catalyst compound. The Cp ligands are distinct from weakly bound ligands (leaving groups) bound to the catalyst compound in that they are not highly susceptible to substitution/abstraction reactions.

Non-limiting examples of metallocene catalyst compounds consistent with the description herein include: cyclopentadienylzirconium $X_n$, indenylzirconium $X_n$, (1-methylindenyl)zirconium $X_n$, (2-methylindenyl)zirconium $X_n$, (1-propylindenyl)zirconium $X_n$, (2-propylindenyl)zirconium $X_n$, (1-butylindenyl)zirconium $X_n$, (2-butylindenyl)zirconium $X_n$, (methylcyclopentadienyl)zirconium $X_n$, tetrahydroindenylzirconium $X_n$, (pentamethylcyclopentadienyl)zirconium $X_n$, cyclopentadienylzirconium $X_n$, pentamethylcyclopentadienyltitanium $X_n$, tetramethylcyclopentyltitanium $X_n$, 1,2,4-trimethylcyclopentadienylzirconium $X_n$, dimethylsilyl(1,2,3,4-tetramethylcyclopentadienyl)(cyclopentadienyl)zirconium $X_n$, dimethylsilyl(1,2,3,4-tetramethylcyclopentadienyl)(1,2,3-trimethyl-cyclopentadienyl)zirconium $X_n$, dimethylsilyl(1,2,3,4-tetramethylcyclopentadienyl)(1,2-dimethyl-cyclopentadienyl)zirconium $X_n$, dimethylsilyl(1,2,3,4-tetramethylcyclopentadienyl)(2-methylcyclopentadienyl)zirconium $X_n$, dimethylsilyl(cyclopentadienyl)(indenyl)zirconium $X_n$, dimethylsilyl(2-methylindenyl)(fluorenyl)zirconium $X_n$, diphenylsilyl(1,2,3,4-tetramethyl-cyclopentadienyl)(3-propylcyclopentadie-nyl)zirconium $X_n$, dimethylsilyl(1,2,3,4-tetramethylcyclopentadienyl) (3-t-butylcyclopentadienyl) zirconium $X_n$, dimethylgermyl(1,2- dimethylcyclopentadienyl)(3-isopropylcyclopentadienyl)-zirconium $X_n$, dimethylsilyl(1,2,3,4-tetramethylcyclopentadienyl)(3-methylcyclopentadienyl)zirconium $X_n$, diphenylmethylidene(cyclopentadienyl)(9-fluorenyl)zirconium $X_n$, diphenylmethylidene(cyclopentadienyl)(indenyl) zirconium $X_n$, iso-propylidenebis(cyclopentadienyl)zirconium $X_n$, iso-propylidene(cyclopentadienyl)(9-fluorenyl) zirconium $X_n$, iso-propylidene(3-methylcyclopentadienyl)(9-fluorenyl)zirconium $X_n$, ethylenebis(9-fluorenyl) zirconium $X_n$, meso-ethylenebis(1-indenyl)zirconium $X_n$, ethylenebis(1-indenyl)zirconium $X_n$, ethylenebis(2-methyl-1-indenyl)zirconium $X_n$, ethylenebis(2-methyl-4,5,6,7-tetrahydro-1-indenyl)zirconium $X_n$, ethylenebis(2-propyl-4,5,6,7-tetrahydro-1-indenyl)zirconium $X_n$, ethylenebis(2-isopropyl-4,5,6,7-tetrahydro-1-indenyl)zirconium $X_n$, ethylenebis(2-butyl-4,5,6,7-tetrahydro-1-indenyl)zirconium $X_n$, ethylenebis(2-isobutyl-4,5,6,7-tetrahydro-1-indenyl)zirconium $X_n$, dimethylsilyl(4,5,6,7-tetrahydro-1-indenyl)zirconium $X_n$, diphenyl(4,5,6,7-tetrahydro-1-indenyl)zirconium $X_n$, ethylenebis(4,5,6,7-tetrahydro-1-indenyl) zirconium $X_n$, dimethylsilylbis(cyclopentadienyl)zirconium $X_n$, dimethylsilylbis(9-fluorenyl)zirconium $X_n$, dimethylsilylbis(1-indenyl)zirconium $X_n$, dimethylsilylbis(2-methylindenyl)zirconium $X_n$, dimethylsilylbis(2-propylindenyl)zirconium $X_n$, dimethylsilylbis(2-butylindenyl)zirconium $X_n$, diphenylsilylbis(2-methylindenyl)zirconium $X_n$, diphenylsilylbis(2-propylindenyl)zirconium $X_n$, diphenylsilylbis(2-butylindenyl)zirconium $X_n$, dimethylgermylbis(2-methylindenyl)zirconium $X_n$, dimethylsilylbis(tetrahydroindenyl)zirconium $X_n$, dimethylsilylbis(tetramethylcyclopentadienyl)zirconium $X_n$, dimethylsilyl(cyclopentadienyl)(9-fluorenyl)zirconium $X_n$, diphenylsilyl(cyclopentadienyl)(9-fluorenyl)zirconium $X_n$, diphenylsilylbis(indenyl)zirconium $X_n$, cyclotrimethylenesilyl(tetramethylcyclopentadienyl)(cyclopentadienyl)zirconium $X_n$, cyclotetramethylenesilyl(tetramethylcyclopentadienyl)(cyclopentadienyl)zirconium $X_n$, cyclotrimethylenesilyl(tetramethylcyclopentadienyl)(2-methylindenyl)zirconium $X_n$, cyclotrimethylenesilyl(tetramethylcyclopentadienyl)(3-methylcyclopentadienyl)zirconium $X_n$, cyclotrimethylenesilylbis(2-methylindenyl) zirconium $X_n$, cyclotrimethylenesilyl(tetramethylcyclopentadienyl)(2,3,5-trimethylcyclopentadienyl)zirconium $X_n$, cyclotrimethylenesilylbis(tetramethylcyclopentadienyl)zirconium $X_n$, dimethylsilyl(tetramethylcyclopentadieneyl)(N-tert-butylamido)titanium $X_n$, bis(cyclopentadienyl)chromium $X_n$, bis(cyclopentadienyl)zirconium $X_n$, bis(n-butylcyclopentadienyl)zirconium $X_n$, bis(n-dodecyclcyclopentadienyl)zirconium $X_n$, bis(ethylcyclopentadienyl)zirconium $X_n$, bis(iso-butylcyclopentadienyl)zirconium $X_n$, bis(iso-propylcyclopentadienyl)zirconium $X_n$, bis(methylcyclopentadienyl)zirconium $X_n$, bis(n-oxtylcyclopentadienyl)zirconium $X_n$, bis(n-pentylcyclopentadienyl)zirconium $X_n$, bis(n-propylcyclopentadienyl)zirconium $X_n$, bis(trimethylsilylcyclopentadienyl)zirconium $X_n$, bis(1,3-bis(trimethylsilyl)cyclopentadienyl)zirconium $X_n$, bis(1-ethyl-2-methylcyclopentadienyl)zirconium $X_n$, bis(1-ethyl-3-methylcyclopentadienyl)zirconium $X_n$, bis(pentamethylcyclopentadienyl)zirconium $X_n$, bis(pentamethylcyclopentadienyl)zirconium $X_n$, bis(1-propyl-3-methylcyclopentadienyl)zirconium $X_n$, bis(1-butyl-3-methylcyclopentadienyl)zirconium $X_n$, bis(1-isobutyl-3-methylcyclopentadienyl)zirconium $X_n$, bis(1-propyl-3-butylcyclopentadienyl)zirconium $X_n$, bis(1-n-butyl-3-n-butylcyclopentadienyl)zirconium $X_n$, bis(1,3-methyl-n-butylcyclopentadienyl)zirconium $X_n$, bis(4,7-dimethylindenyl)zirconium $X_n$, bis(indenyl)zirconium $X_n$, bis(2-methylindenyl)zirconium $X_n$, cyclopentadienylindenyl zirconium $X_n$, (tetramethyl cyclopentadienyl) (n-propyl cyclopentadienyl)zirconium $X_n$, (pentamethyl cyclopentadienyl) (n-propyl cyclopentadienyl)zirconium $X_n$, bis(n-propylcyclopentadienyl)hafnium $X_n$, bis(n-butylcyclopentadienyl)hafnium $X_n$, bis(n-pentylcyclopentadienyl)hafnium $X_n$, (n-propyl cyclopentadienyl)(n-butyl cyclopentadienyl) hafnium $X_n$, bis[(2-trimethylsilylethyl)cyclopentadienyl] hafnium $X_n$, bis(trimethylsilyl cyclopentadienyl)hafnium $X_n$, bis(2-n-propylindenyl)hafnium $X_n$, bis(2-n-butylindenyl)hafnium $X_n$, dimethylsilylbis(n-propylcyclopentadienyl)hafnium $X_n$, dimethylsilylbis(n-butylcyclopentadienyl) hafnium $X_n$, bis(9-n-propylfluorenyl)hafnium $X_n$, bis(9-n-butylfluorenyl)hafnium $X_n$, (9-n-propylfluorenyl)(2-n-propylindenyl)hafnium $X_n$, bis(1-n-propyl-2-methylcyclopentadienyl)hafnium $X_n$, (n-propylcyclopentadienyl)(1-n-propyl-3-n-butylcyclopentadienyl)hafnium $X_n$, dimethylsilyl(tetramethylcyclopentadienyl)(cyclopropylamido)titanium $X_n$, dimethylsilyl(tetramethyleyclopentadienyl)(cyclobutylamido)titanium $X_n$, dimethylsilyl(tetramethyleyclopentadienyl)(cyclopentylamido)titanium $X_n$, dimethylsilyl(tetramethylcyclopentadienyl)(cyclohexylamido)titanium $X_n$, dimethylsilyl(tetramethylcyclopentadienyl)(cycloheptylamido)titanium $X_n$, dimethylsilyl(tetramethylcyclopentadienyl)(cyclooctylamido)titanium $X_n$, dimethylsilyl(tetramethylcyclopentadienyl)(cyclononylamido)titanium $X_n$, dimethylsilyl(tetramethylcyclopentadienyl)(cyclodecylamido)titanium $X_n$, dimethylsilyl(tetramethylcyclopentadienyl)(cycloundecylamido)titanium $X_n$, dimethylsilyl(tetramethylcyclopentadienyl)(cyclododecylamido)titanium $X_n$, dimethylsilyl(tetramethylcyclopentadienyl)(sec-butylamido)titanium $X_n$, dimethylsilyl(tetramethylcyclopentadienyl)(n-octylamido) titanium $X_n$, dimethylsilyl(tetramethylcyclopentadienyl)(n-decylamido)titanium $X_n$, dimethylsilyl(tetramethylcyclopentadienyl)(n-octadecylamido)titanium $X_n$, methylphenylsilyl(tetramethylcyclopentadienyl)(cyclopropylamido)titanium $X_n$, methylphenylsilyl(tetramethylcyclopentadienyl)(cyclobutylamido)titanium $X_n$, methylphenylsilyl(tetramethylcyclopentadienyl)(cyclopentylamido) titanium $X_n$, methylphenylsilyl (tetramethylcyclopentadienyl)(cyclohexylamido)titanium $X_n$, methylphenylsilyl(tetramethylcyclopentadienyl)(cycloheptylamido)titanium $X_n$, methylphenylsilyl(tetramethylcyclopentadienyl)(cyclooctylamido)titanium $X_n$, methylphenylsilyl(tetramethylcyclopentadienyl)(cyclononylamido) titanium $X_n$, methylphenylsilyl(tetramethylcyclopentadienyl)(cyclodecylamido)titanium, $X_n$, methylphenylsilyl(tetramethylcyclopentadienyl)(cycloundecylamido)titanium $X_n$, methylphenylsilyl(tetramethylcyclopentadienyl)(cyclododecylamido)titanium $X_n$, methylphenylsilyl(tetramethylcyclopentadienyl)(sec-butylamido)titanium $X_n$, methylphenylsilyl(tetramethylcyclopentadienyl)(n-octylamido)titanium $X_n$, methylphenylsilyl(tetramethylcyclopentadienyl)(n-decylamido)titanium $X_n$, methylphenylsilyl(tetramethylcyclopentadienyl)(n-octadecylamido)titanium $X_n$, diphenylsilyl(tetramethylcyclopentadienyl)(cyclopropylamido)titanium $X_n$, diphenylsilyl(tetramethylcyclopentadienyl)(cyclobutylamido)titanium $X_n$, diphenylsilyl(tetramethylcyclopentadienyl)(cyclopentylamido)titanium $X_n$, diphenylsilyl(tetramethylcyclopentadienyl)(cyclohexylamido)titanium $X_n$, diphenylsilyl(tetramethylcyclopentadienyl)(cycloheptylamido)titanium $X_n$, diphenylsilyl(tetramethylcyclopentadienyl)(cyclooctylamido)titanium $X_n$, diphenylsilyl(tetramethylcyclopentadienyl)(cyclononylamido)titanium $X_n$, diphenylsilyl(tetramethylcyclopentadienyl)(cyclodecylamido)titanium $X_n$, diphenylsilyl(tetramethylcyclopentadienyl)(cycloundecylamido)titanium $X_n$, diphenylsilyl(tetramethylcyclopentadienyl)(cyclododecylamido)titanium $X_n$, diphenylsilyl(tetramethylcyclopentadienyl)(sec-butylamido)titanium $X_n$, diphenylsilyl(tetramethyleyclopentadienyl)(n-octylamido)titanium $X_n$, diphenylsilyl(tetramethyleyclopentadienyl)(n-decylamido)titanium $X_n$, diphenylsilyl (tetramethylcyclopentadienyl)(n-octadecylamido)titanium $X_n$, and derivatives thereof, wherein the value of n is 1, 2 or 3. The phrase "derivatives thereof" will be understood to mean any substitution or ring formation as described above for structures (Va-d) in one exemplary embodiment; and in particular, replacement of the metal "M" (Cr, Zr, Ti or Hf) with an atom selected from the group consisting of Cr, Zr, Hf and Ti; and replacement of the "X" group with any of $C_1$ to $C_5$ alkyls, $C_6$ aryls, $C_6$ to $C_{10}$ alkylaryls, $C_1$-$C_{10}$ perfluoroalkyls, fluorine, chlorine, or bromine.

It is contemplated that the metallocene catalyst compounds described above include their structural, geometric, or optical or enantiomeric isomers (racemic mixture), and, in one exemplary embodiment, may be a pure enantiomer.

Activator

In some embodiments, the catalyst compound (e.g., the metallocene catalyst compound) may be activated by an activator. In such embodiments, the activator used with the catalyst compositions of the present disclosure may comprise an aluminoxane activator. Aluminoxanes are generally oligomeric compounds containing —Al($R^1$)—O— subunits, where $R^1$ is an alkyl group. Examples of aluminoxanes include methylaluminoxane (MAO), modified methylaluminoxane (MMAO), ethylaluminoxane, and isobutylaluminoxane. Alkylaluminoxanes and modified alkylaluminoxanes are suitable as catalyst activators, particularly when the abstractable ligand is an alkyl, halide, alkoxide or amide. Mixtures of different aluminoxanes and modified aluminoxanes may also be used. It may be preferable to use a visually clear methylaluminoxane. A cloudy or gelled aluminoxane can be filtered to produce a clear solution or clear aluminoxane can be decanted from the cloudy solution. A useful aluminoxane is a MMAO cocatalyst type 3A (commercially available from Akzo Chemicals, Inc. under the trade name Modified Methylaluminoxane type 3A, covered under patent number U.S. Pat. No. 5,041,584). Another useful aluminoxane is solid polymethylaluminoxane as described in U.S. Pat. Nos. 9,340,630; 8,404,880 and 8,975,209.

In one embodiment, the activator comprises MAO, which may be present in the catalyst compositions of the present disclosure in an amount in the range of from 3 to 9 mmole MAO/gram of support material. In certain preferred embodiments, the MAO is present in an amount in the range of from 4 to 7.7 mmole MAO/gram of support material. In certain more preferred embodiments, the MAO is present in an amount in the range of from 5 to 6.5 mmole MAO/gram of support material. In certain most preferred embodiments, the MAO is present in an amount in the range of from 6 to 6.5 mmole MAO/gram of support material. The MAO activator may be associated with or bound to a support, either in association with the catalyst compound (e.g., metallocene) or separate from the catalyst compound.

Support Material

The porous support material 110 may also be present as part of the supported catalyst 104 generated using the embodiments of the present disclosure. The terms "support" or "carrier" may be used interchangeably herein and refer to any support material, including inorganic or organic support materials. Non-limiting examples of the porous support material 110 include inorganic oxides and inorganic chlorides, and in particular such materials as silica, glass, talc, clay, alumina, magnesia, zirconia, iron oxides, boria, calcium oxide, zinc oxide, barium oxide, thoria, ceramic, aluminum phosphate gel, and polymers such as polyvinylchloride and substituted polystyrene, functionalized or cross-linked organic supports such as polystyrene divinyl benzene polyolefins or polymeric compounds, and mixtures thereof, and graphite, in any of its various forms.

The porous support material 110 may be contacted with the other components of the catalyst system in any number of ways. In one exemplary embodiment, the porous support material 110 is contacted with the activator to form an association between the activator and the porous support material 110, or a "bound activator." In another exemplary embodiment, the catalyst compound may be contacted with the porous support material 110 to form a "bound catalyst compound." In yet another exemplary embodiment, the porous support material 110 may be contacted with the activator and catalyst compound together, or with each partially in any order. The components may be contacted by any suitable means as in a solution, a slurry, or solid form, or some combination thereof. In certain exemplary embodiments, the components may also be heated to a temperature in the range of from 25° C. to 250° C. while being contacted, as described herein with reference to the heating jacket 122 (FIG. 1).

Desirable carriers as the porous support material 110 include inorganic oxides that include Group 2, 3, 4, 5, 13 and 14 oxides and chlorides. Support materials include silica, alumina, silica-alumina, magnesium chloride, graphite, and mixtures thereof in one exemplary embodiment. Other useful supports include magnesia, titania, zirconia, montmorillonite, phyllosilicate, and the like. In certain exemplary embodiments, combinations of the support materials may be used, including, but not limited to, combinations such as silica-chromium, silica-alumina, silica-titania, and the like.

In one or more embodiments, the porous support material 110 possesses a surface area in the range of from 10 to 700 $m^2$/gram, a pore volume in the range of from 0.1 to 4.0 $cm^3$/gram and an average particle size in the range of from about 1 to about 500 μm. In another exemplary embodiment, the porous support material 110 has a surface area in the range of from 50 to 500 $m^2$/gram, a pore volume of from 0.5 to 3.5 $cm^3$/gram, and an average particle size of from 10 to 200 m. In yet another exemplary embodiment, the porous support material 110 has a surface area in the range of from 100 to 400 $m^2$/gram, a pore volume from 0.8 to 3.0 $cm^3$/gram, and an average particle size of from 5 to 100 μm. In still another exemplary embodiment, the porous support material 110 has a surface area in the range of from 150 to 450 $m^2$/gram, a pore volume in the range of from 1 to 2.5 $cm^3$/gram and an average particle size in the range of from 10 to 50 μm. In another exemplary embodiment, the porous support material 110 has a surface area in the range of from 250 to 400 $m^2$/gram, a pore volume of from 1.25 to 2.0 $cm^3$/gram, and an average particle size of from 15 to 40 μm. In yet another exemplary embodiment, the porous support material 110 has a surface area in the range of from 300 to 350 $m^2$/gram, a pore volume in the range of from 1.5 to 1.75 $cm^3$/gram, and an average particle size of from 20 to 30 m. Generally, the average pore size of the porous support material 110 ranges from 10 to 1000 Å. In one exemplary embodiment, the average pore size of the porous support material 110 is in the range of from 50 to 500 Å, while in yet another exemplary embodiment the average pore size ranges from 75 to 350 Å.

In one or more example embodiments, the porous support material 110 is silica. In one example embodiment, the silica is a powder; in another example embodiment, the silica is flake silica. In another example embodiment, the silica has a particle size of from 1 to 500 microns. In still another example embodiment, the silica has a particle size ranging from 1 to 400 microns, while in yet another example embodiment, the silica has a particle size in the range of from 1 to 200 microns. In yet another example embodiment, the silica has a particle size in the range of from 1 to 100 microns.

It is within the scope of the present invention to co-contact (or "co-immobilize") more than one catalyst compound with the porous support material 110. Non-limiting examples of co-immobilized catalyst compounds include two or more of the same or different metallocene catalyst compounds, one or more metallocene catalyst compounds co-immobilized with a Ziegler-Natta type catalyst, one or more metallocene catalyst compounds co-immobilized with a chromium or "Phillips" type catalyst, one or more metallocene catalyst compounds co-immobilized with a Group 15-containing catalyst, and any of these combinations with one or more activators. More particularly, co-supported combinations include metallocene A/metallocene A; metallocene A/metallocene B; metallocene/Ziegler Natta; metallocene/Group 15 containing catalyst; metallocene/chromium catalyst; metallocene/Ziegler Natta/Group 15 containing catalyst; metallocene/chromium catalyst/Group 15 containing catalyst, any of these with an activator, and combinations thereof.

To facilitate a better understanding of the present disclosure, the following examples are given. In no way should the following examples be read to limit, or to define, the scope of the disclosure.

Lab experiments were designed and undertaken to observe the mixability limits of metallocene catalyst mixtures. It was observed that metallocene catalyst added to toluene while being stirred forms a hard cake at a ratio of 1.9 mL Tol/g Catalyst. This ratio at which the mixture can no longer be stirred will be referred to herein as the "caking point."

The liquid to solid ratio at which current catalyst mixture forms a hard cake can be derived with knowledge of the following: the density of toluene ($\rho_{Tol}$); catalyst yield per lb. of silica (g Cat/g silica) (Y); the mass concentration of toluene in premix (g toluene/g premix) (C); and the premix (toluene along with dissolved components). In this ratio, solid is defined as just silica, while liquid is defined as the premix solution (solutes and solvent). Using the lab observed caking point for toluene and catalyst ratio:

$$\frac{\text{Liquid}}{\text{Solid}}\left(\frac{g}{g}\right) = \frac{\frac{1.9 \text{ mL}}{\text{g Cat}} * Y * \rho_{Tol}}{C} = 2.6.$$

Based on lab observations, the preparation mixture for metallocene catalyst becomes unmixable, forming a hard cake at a liquid-solid ratio of 2.6 g/g. One can infer that area of safe operation is some degree greater, and the caking point defined here can be used as a reference.

Example 1: Regular Batch Solids First

A normal batch for a particular catalyst formulation proceeds as follows: Step 1: 850 lbs. of silica loaded to the catalyst mix vessel (CMV). Step 2: Simultaneously, the premix is prepared in a separate vessel. Liquid materials required for this formula combine to a total liquid mass of 2,750 lbs. Step 3: The liquid is then transferred from the premix vessel to the CMV to combine with the silica. The CMV agitator rotates at a speed of 25 rpm as the liquid is added. The mixture passes through a highly viscous 'mud stage' where the agitator motor reaches a peak of 35 amps. The mixture then transcends into a slurry and the load on the agitator returns to a baseline mixing load. Step 4: The premix vessel is rinsed into the CMV, and additional liquid components are then added directly to the existing slurry in the CMV. Final ratio of liquid-solid in the mixture is 3.8 g/g. Step 5: Drying begins. The vessel is heated to a predetermined temperature and a gas is used to sparge the mixture aiding removal of the solvent. Step 6: Once drying is complete the silica affixed with components dissolved in the liquid premix are discharged from the CMV.

Example 2: Large Batch Solids First

A second formulation of the procedure to manufacture the same catalyst in a larger quantity differs from Example 1 as follows: 1,150 lbs. of silica is loaded in Step 1 instead of 850 lbs. The premix combines to a total liquid mass of 3,750 lbs. The premix is transferred to the CMV containing silica. As the premix is transferred, the CMV agitator encounters the highly viscous mud stage. With the large material volume, the agitator is unable to overcome the mud stage and the amps on the agitator exceed its power capabilities and damage the motor. In order to avoid damage to the agitator motor, mixing is stopped and production of the batch is aborted. It is concluded that the agitator is unable to overcome the highly viscous mud stage for this volume of material with the procedure outlined in Example 1.

Example 3: Regular Batch Liquid First

The liquid first approach refers to the reversal of the addition order of liquid and solid components to the CMV, as generally described herein. In this formulation, the premix is prepared in the CMV instead of a separate vessel. Once the premix is ready, silica is added to the CMV. The same amounts of solid and liquid in Example 1 are combined in this formulation. The difference as compared to Example 1 is that the agitator no longer encounters a highly viscous mud stage. Instead, the mixture starts as a liquid and goes directly to a slurry as the solid is added. It is concluded from this batch that the liquid first procedure allows the CMV agitator to process more material than the solids first (liquid-to-solid) procedure used in Example 1.

Example 4: Large Batch Liquid First

This formulation is identical to Example 3, with the exception of the amount of material added. The large batch formula requires a 3,750 lb. liquid premix, followed by the addition of 1,150 lbs. of silica. At the end of liquid addition, the liquid-solid ratio remains above the caking point. This combination of good liquid-solid ratio and no spike in agitator amps (mud stage) observed in Example 2 makes it possible to achieve large batch production in this manner.

Example 5: Solid-Liquid-Liquid-Solid

Another formulation of the catalyst preparation procedure outlined in Example 1 aims to produce a large batch with the solid first (standard) addition order. This is achieved as follows: Steps 1-3 are the same as Example 1. The mud stage is present and passes with the same peak amps outlined in Example 1. Step 4: A second premix quantity of 1,000 lbs. is prepared in a separate vessel. This additional liquid is added to the CMV to bring the total liquid quantity to 3,750 lbs. (same as large batch liquid in Example 2). The additional liquid is fed into a slurry, which increases the liquid-solid ratio from 3.2 to 4.4 g/g. Step 5: A second silica quantity of 300 lbs. is added to the mixture. This addition brings the liquid-solid ratio to 3.2 g/g, remaining well above the predetermined caking point of 2.6 g/g. The CMV contents are mixed before steps 4-6 of Example 1 and executed in a similar manner.

This same procedure can be executed with several smaller alternating additions of liquid and solid, provided that the caking point of the liquid-solid ratio is not reached. The mixture in this case does not re-enter a mud stage and the agitator amps maintain a similar pattern to that as observed in Example 3. Table 1 below outlines another approach where three additions (aliquots) of liquid and solid are used to get to the final large batch production target.

TABLE 1

| Addition Step | Material Added (lb) | Total Solid (lb) | Total Liquid (lb) | Liquid-Solid Ratio (g/g) |
| --- | --- | --- | --- | --- |
| Initial Silica Charge | 850 | 850 | 0 | — |
| Initial Premix | 2750 | 850 | 2750 | 3.24 |
| 2nd Premix | 333 | 850 | 3083 | 3.63 |
| 2nd Silica | 100 | 950 | 3083 | 3.25 |
| 3rd Premix | 333 | 950 | 3416 | 3.60 |
| 3rd Silica | 100 | 1050 | 3416 | 3.25 |
| 4th Premix | 334 | 1050 | 3750 | 3.57 |
| 4th Silica | 100 | 1150 | 3750 | 3.26 |
| Rinses and Excess Liquid | 600 | 1150 | 4350 | 3.78 |

As the Table 1 data indicate, the solid (silica) may be added in aliquots ranging between about 0 lb. and about 300 lb., such as in aliquots of about 100 lb. Similarly, the liquid (metallocene solution) may be added in aliquots ranging between about 0 lb. and about 1,600 lb., such as in aliquots of about 333 lb. During this process, the liquid-solid ratio remains well above the caking point of 2.6 g/g. This data may prove advantageous in ensuring the catalyst is properly processed within limits during mass production. Moreover, similar testing may be done with other types of solvents (other than toluene) to determine the corresponding cake point, and the resulting data may provide guidance for hybrid sequential additions to ensure the liquid-solid ratio is maintained above the cake point to prevent problems.

Example 6: Liquid-Solid-Solid-Liquid

Several different permutations of addition order are possible from the method outlined in Example 5. The quantity of addition in each stage is also variable, as long as the liquid-solid ratio is within the safe region away the caking point. Table 2 below outlines a procedure, which begins with liquid addition—this method therefore never encounters a mud stage. Alternating additions (aliquots) of solid and liquid are portioned to maintain acceptable liquid-solid ratio.

TABLE 2

| Addition Step | Material Added (lb) | Total Solid (lb) | Total Liquid (lb) | Liquid-Solid Ratio (g/g) |
| --- | --- | --- | --- | --- |
| Initial Premix | 3050 | 0 | 3050 | |
| Initial Silica Charge | 850 | 850 | 3050 | 3.59 |
| 2nd Silica | 100 | 950 | 3050 | 3.21 |
| 2nd Premix | 350 | 950 | 3400 | 3.58 |
| 3rd Silica | 100 | 1050 | 3400 | 3.24 |
| 3rd Premix | 350 | 1050 | 3750 | 3.57 |
| 4th Silica | 100 | 1150 | 3750 | 3.26 |
| Rinses and Excess Liquid | 600 | 1150 | 4350 | 3.78 |

As the Table 2 data indicate, the solid (silica) may be added in aliquots ranging between about 0 lb. and about 300 lb., such as in aliquots of about 100 lb. Similarly, the liquid (metallocene solution) may be added in aliquots ranging between about 0 lb. and about 1,300 lb., such as in aliquots of about 350 lb. During this process, the liquid-solid ratio remains well above the caking point of 2.6 g/g. Similar to the data of Table 1, this data may prove advantageous in ensuring the catalyst is processed properly within limits during mass production. Moreover, similar testing may gain be done with other types of solvents (other than toluene) to determine the corresponding cake point, and the resulting data may provide guidance for hybrid sequential additions to ensure the liquid-solid ratio is maintained above the cake point to prevent problems.

Example 7: Large Batch with Large Motor

Example 2 illustrates an attempt to manufacture a large batch that was limited by the operational capacity of the agitator. Meanwhile, Example 1 illustrated that during the production of a regular batch the agitator amps peaked at 35 as it overcame the mud stage. By knowing the amps and voltage supplied to the motor, one may be able to determine the power required to overcome the mud stage.

$P = I*V$,

P=35 amps*460 volts=16100 W, where P=Power (W), I=Current (amps) and, V=Voltage (volts). The agitator motor on this particular line is rated at 25 hp (18.6 kW). The 16.1 kW calculated above is equivalent to 21.6 hp. The torque required for mixing in Example 1 is determined from the following equations:

$$P = 2\pi * N * Tq$$

$$Tq = \frac{P}{2\pi * N}$$

$$Tq = \frac{21.6 \text{ hp} * \frac{550 \frac{\text{lbf} \cdot \text{ft}}{\text{s}}}{1 \text{ hp}}}{2\pi * 25 \text{ rpm} \frac{1 \text{ rps}}{60 \text{ rpm}}} = 4536 \text{ ft} \cdot \text{lbf},$$

where P=Power (hp), Tq=Torque (ft-lbf), and N=Agitator Speed (rpm). This torque force can be put on a basis of solid mass as we compare torque for other batch sizes.

$$Tq \text{ per lb silica} = \frac{Tq}{\text{lbs of silica}} = \frac{4536 \text{ ft} \cdot \text{lbf}}{850 \text{ lbs}} = 5.34 \frac{\text{ft} \cdot \text{lbf}}{\text{lbs}}$$

If a large batch requires the same force per lb. of solid material to overcome its mud stage at a rotational speed of 25 rpm, reversal of the above sequence of equations can then determine the power required to overcome the mud stage for a large batch.

$$5.34 \frac{\text{ft} \cdot \text{lbf}}{\text{lbs}} = \frac{Tq}{1150 \text{ lbs of silica}}$$

$$Tq = 5.34 \frac{\text{ft} \cdot \text{lbf}}{\text{lbs Silica}} * 1150 \text{ lbs of Silica} = 6136.71 \text{ ft} \cdot \text{lbf}$$

Mixing at a speed of 25 rpm the power requirement is as follows:

$$P = 2\pi * N * Tq =$$

$$2\pi * 25 \text{ rpm} \frac{1 \text{ rps}}{60 \text{ rpm}} * 6136.7 \text{ ft} \cdot \text{lbf} * \frac{1 \text{ hp}}{550 \frac{\text{lbf} \cdot \text{ft}}{\text{s}}} = 29.2 \text{ hp.}$$

To produce a large batch with the procedure outlined in Example 2, therefore, requires an agitator motor that is 30 hp or greater. The peak amps during this mud stage is predicted to be:

$$I = \frac{P}{V} = 47.3 \text{ amps.}$$

In conclusion, Example 7 outlines production of a large batch via the same method as Example 1 with a 30 hp agitator motor passing through the mud stage as the motor amps peak at about −50.

Example 8: Large Batch with Variable Speed Motor

From the calculations derived in Example 7, it is clear that the power draw on the agitator motor is affected by the speed of rotation. The data presented in Example 2 illustrates that a 25 hp motor is incapable of overcoming the mud stage of a large batch at 25 rpm. Example 7 fixed the rotational speed and torque per lb of material to determine what size motor would be required to make Example 2 a success. An alternate approach is to determine what rotational speed would allow you to operate within the capabilities of the motor. Depending on the motor type for an existing line this rotational speed might not even be attainable. However, this analysis can be applied when operating with a variable speed motor or designing a new catalyst production line.

An agitation system can be characterized by a power draw curve, which shows how power number (NP) changes with Reynolds number ($N_{Re}$). The equations for these dimensionless parameters are as follows:

$$N_P = \frac{Pg_c}{\rho N^3 D^5},$$

$$N_{Re} = \frac{\rho N D^2}{\mu},$$

where $N_P$=Power Number, P=Power, gc=Gravitational Constant, ρ=Fluid Density, N=Rotational Speed, D=Impeller Diameter, $N_{Re}$=Power Number, and μ=Fluid Viscosity. It is assumed that the silica-premix combination as it passes through its mud stage has a high power number and a low Reynolds number. This is a reasonable assumption as we have noted the spike in agitator amps and the mud stage is defined as the highly viscous regime as the solid material is wetted. In this range of high power number and low Reynolds number, the power curve for this (and many) agitation systems becomes linear—with a negative slope. This means that there is an inverse relationship between $N_P$ and $N_{Re}$.

$$N_P \propto \frac{1}{N_{Re}}$$

or $$N_P = \frac{k}{N_{Re}}$$

The viscosity of the mud stage is difficult to determine experimentally. If we assume that this is constant for a particular mixture, therefore:

$$K = k\mu$$

and $$\frac{Pg_c}{N^2 D^3} = K$$

The above equation provides a way to relate the power draw to different rotational speeds for a particular agitation system (mixture and agitator dimensions). The large batch system defined in Example 7 predicted that a motor able to supply 29.2 hp at a rotational speed of 25 rpm would be able to produce a large batch. The constant, K, for this system is therefore determined as follows:

$$\frac{29.2 \text{ hp} * \frac{550 \frac{\text{lbf} \cdot \text{ft}}{\text{s}}}{1 \text{ hp}} * 32.17 \frac{\text{lb} \cdot \text{ft}}{\text{lbf} \cdot \text{s}^2}}{\left(25 \text{ rpm} * \frac{1 \text{ rps}}{60 \text{ rpm}}\right)^2 * (4.875 \text{ ft})^3} = K$$

$$K = 25698 \frac{\text{lb}}{\text{ft} \cdot \text{s}}.$$

The target rotational speed to obtain a particular power draw from the agitator motor can be defined by rearranging the above equation. Moreover, the constant "K" may be changed if, for example, a different mixer or motor is used. In such embodiments, the resulting K factor may be orders of magnitude lower, which could result in poor catalyst quality. From testing, it has been determined that an acceptable K factor may range between about 10,000 lb./ft. s and about 50,000 lb./ft. s, more preferably within the range of about 20,000 lb./ft. s and about 30.000 lb./ft. s. It was determined that such ranges for K may result in acceptable batches of catalyst with sufficient dispersion of the active components on the silica, thus enhancing the processing of commercial polyethylene in a polymerization process.

$$N = \left(\frac{Pg_c}{KD^3}\right)^{0.5}$$

For example, in order to have a similar power draw on the agitator motor to Example 1, that is 21.6 hp the rotational speed of the agitator must be reduced to:

$$N = \left( \frac{21.6 \text{ hp} * \frac{550 \frac{\text{lbf} \cdot \text{ft}}{\text{s}}}{1 \text{ hp}} * 32.17 \frac{\text{lb} \cdot \text{ft}}{\text{lbf} \cdot \text{s}^2}}{25689 \frac{\text{lb}}{\text{ft} \cdot \text{s}} * (4.875 \text{ ft})^3} \right)^{0.5} = 0.358 \text{ rps} = 21.5 \text{ rpm}.$$

The torque applied to the mixture through the mud stage in this case is 5276 ft-lbf.

$$Tq = \frac{P}{2\pi * N} = \frac{21.6 \text{ hp} * \frac{550 \frac{\text{lbf} \cdot \text{ft}}{\text{s}}}{1 \text{ hp}}}{2\pi * 0.358 \text{ rps}} = 5276 \text{ ft} \cdot \text{lbf}$$

This shows that a consequence to a reduction in rotational speed is that the torque applied by the lower power motor is less than that of the high power motor in Example 7. The torque per pound of material here is 4.6 ft-lbf/lb of silica. While the slower mixer speed may help to alleviate the power draw limitations, it increases the likelihood of concentration gradients being present in the mixture, which leads to the production of a non-uniform batch. This non-uniformity is undesirable and may lead to consequences with catalyst performance in polymerization reactors.

As the torque per pound of material is reduced, there exists a lower limit at which the agitator does not provide enough mixing for the material to be distributed evenly and the batch loses its uniformity. There is a limited range of operation where the torque per pound applied to the mixture is acceptable and yields good catalyst performance in the polymerization process. Based on experience in metallocene catalyst production, the inventors believe that limit is 3.8 ft-lbf/lb of solid material. Table 3 below lists torque and power supply for a range of rotational speeds as determined by the above procedure.

TABLE 3

| Power (hp) | Agitator Speed (rpm) | Torque(ft-lbf)/ lb Silica | Power(hp)/ lb Silica |
|---|---|---|---|
| 15 | 17.9 | 3.8 | 0.013 |
| 21.59 | 21.5 | 4.6 | 0.018 |
| 25 | 23.1 | 4.9 | 0.022 |
| 30 | 25.3 | 5.4 | 0.026 |
| 40 | 29.3 | 6.2 | 0.035 |

The range between about 3 and about 7 Torque/lb of silica (ft-lbf)/lb is an unexpected result not anticipated by the inventors. Knowledge of this range may prove advantageous in helping to specify the requirements for making an acceptable batch with good mixing properties, dispersion, etc. This results in a catalyst that has high activity and good properties, which may enhance the processing of commercial polyethylene in a polymerization process.

Embodiments disclosed herein include: A) A method of producing a supported catalyst that includes introducing a first amount of a porous support material into a catalyst mix vessel, after introducing the first amount of the porous support material into the catalyst mix vessel, introducing a first amount of a dissolved catalyst solution into the catalyst mix vessel, the dissolved catalyst solution comprising a solvent and one or more catalyst compounds dissolved in the solvent, operating the catalyst mix vessel to contact the first amount of the dissolved catalyst solution with the first amount of the porous support material, after operating the catalyst mix vessel to contact the first amount of the dissolved catalyst solution on the first amount of the porous support material, introducing a second amount of the dissolved catalyst solution into the catalyst mix vessel, after introducing the second amount of the dissolved catalyst solution into the catalyst mix vessel, introducing a second amount of the porous support material into the catalyst mix vessel, operating the catalyst mix vessel to contact the second amount of the dissolved catalyst solution on the second amount of the porous support material and thereby generate the supported catalyst, the supported catalyst comprising active catalyst adhered to the porous support material, and discharging the supported catalyst from the catalyst mix vessel.

B) A method of producing a supported catalyst includes introducing a first amount of a porous support material into a catalyst mix vessel, after introducing the first amount of the porous support material into the catalyst mix vessel, introducing a first amount of a dissolved catalyst solution into the catalyst mix vessel, the dissolved catalyst solution comprising a solvent and one or more catalyst compounds dissolved in the solvent, operating the catalyst mix vessel to contact the first amount of the dissolved catalyst solution with the first amount of the porous support material, after operating the catalyst mix vessel to contact the first amount of the dissolved catalyst solution on the first amount of the porous support material, introducing a second amount of the porous support material into the catalyst mix vessel, after introducing the second amount of the porous support material into the catalyst mix vessel, introducing a second amount of the dissolved catalyst solution into the catalyst mix vessel, operating the catalyst mix vessel to contact the second amount of the dissolved catalyst solution on the second amount of the porous support material and thereby generate the supported catalyst, the supported catalyst comprising active catalyst adhered to the porous support material, and discharging the supported catalyst from the catalyst mix vessel.

C) A method of producing a supported catalyst includes introducing a dissolved catalyst solution into a catalyst mix vessel, the dissolved catalyst solution comprising a solvent and one or more catalyst compounds dissolved in the solvent, after introducing the dissolved catalyst solution into the catalyst mix vessel, introducing a porous support material into the catalyst mix vessel, operating the catalyst mix vessel to contact the dissolved catalyst solution on the porous support material and thereby generate the supported catalyst, the supported catalyst comprising active catalyst adhered to the porous support material, and discharging the supported catalyst from the catalyst mix vessel.

Each of embodiments A, B, and C may have one or more of the following additional elements in any combination: Element 1: wherein the dissolved catalyst solution comprises a metallocene. Element 2: wherein the dissolved catalyst solution further comprises an activator comprising an alkylaluminoxane or modified alkylaluminoxane selected from the group consisting of methylaluminoxane, modified methylaluminoxane, ethylaluminoxane, isobutylaluminoxane, solid polymethylaluminoxane, and any combination thereof. Element 3: wherein the solvent is selected from the group consisting of a hydrocarbon, an aromatic hydrocarbon, a halogenated hydrocarbon, and any combination thereof. Element 4: wherein discharging the supported catalyst from the catalyst mix vessel is preceded by drying the supported catalyst within the catalyst mix vessel. Element 5: wherein the porous support material is selected from the group consisting of silica, glass, talc, clay, alumina, silica-alumina, silica-chromium, magnesium chloride, magnesia, titania, silica-titania, zirconia, iron oxide, boria, calcium oxide, zinc oxide, barium oxide, thoria, montmorillonite, phyllosilicate, aluminum phosphate gel, a polymer, and any combination thereof.

Element 6: wherein the dissolved catalyst solution comprises a metallocene. Element 7: wherein the dissolved catalyst solution further comprises an activator comprising an alkylaluminoxane or modified alkylaluminoxane selected from the group consisting of methylaluminoxane, modified methylaluminoxane, ethylaluminoxane, isobutylaluminoxane, solid polymethylaluminoxane, and any combination thereof. Element 8: wherein the solvent is selected from the group consisting of a hydrocarbon, an aromatic hydrocarbon, a halogenated hydrocarbon, and any combination thereof. Element 9: wherein the porous support material is selected from the group consisting of silica, glass, talc, clay, alumina, silica-alumina, silica-chromium, magnesium chloride, magnesia, titania, silica-titania, zirconia, iron oxide, boria, calcium oxide, zinc oxide, barium oxide, thoria, montmorillonite, phyllosilicate, aluminum phosphate gel, a polymer, and any combination thereof.

Element 10: wherein the dissolved catalyst solution comprises a metallocene. Element 11: wherein the dissolved catalyst solution further comprises an activator. Element 12: wherein the activator comprises an alkylaluminoxane or modified alkylaluminoxane. Element 13: wherein the alkylaluminoxane or modified alkylaluminoxane is selected from the group consisting of methylaluminoxane, modified methylaluminoxane, ethylaluminoxane, isobutylaluminoxane, solid polymethylaluminoxane, and any combination thereof. Element 14: wherein the solvent is selected from the group consisting of a hydrocarbon, an aromatic hydrocarbon, a halogenated hydrocarbon, and any combination thereof. Element 15: wherein discharging the supported catalyst from the catalyst mix vessel is preceded by drying the supported catalyst within the catalyst mix vessel. Element 16: wherein the porous support material is selected from the group consisting of silica, glass, talc, clay, alumina, silica-alumina, silica-chromium, magnesium chloride, magnesia, titania, silica-titania, zirconia, iron oxide, boria, calcium oxide, zinc oxide, barium oxide, thoria, montmorillonite, phyllosilicate, aluminum phosphate gel, a polymer, and any combination thereof. Element 17: wherein the dissolved catalyst solution is added as a first amount and a second amount and the porous support material is added as a first amount and a second amount, and wherein the first amount of the porous support material is added after the first amount of the dissolved catalyst solution, the second amount of the dissolved catalyst solution is added after the first amount of the porous support material, and the second amount of the porous support material is added after the second amount of the dissolved catalyst solution. Element 18: wherein the dissolved catalyst solution is added as a first amount and a second amount and the porous support material is added as a first amount and a second amount, and wherein the first amount of the porous support material is added after the first amount of the dissolved catalyst solution, the second amount of the porous support material is added after the first amount of the porous support material, and the second amount of the dissolved catalyst solution is added after the second amount of the porous support material.

By way of non-limiting example, exemplary combinations applicable to A, B, and C include: Element 1 with Element 2; Element 1 with Element 3; Element 1 with Element 4; Element 1 with Element 5; Element 2 with Element 3; Element 2 with Element 4; Element 2 with Element 5; Element 5 with Element 3; Element 5 with Element 4; Element 6 with Element 7; Element 6 with Element 8; Element 6 with Element 9; Element 7 with Element 8; Element 8 with Element 6; Element 8 with Element 9; Element 10 with Element 11; Element 10 with Element 14; Element 10 with Element 15; Element 10 with Element 16; Element 10 with Element 17; Element 10 with Element 18; Element 11 with Element 12; Element 12 with Element 13; Element 13 with Element 14; Element 16 with Element 14; Element 16 with Element 15; Element 16 with Element 17; and Element 16 with Element 18.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A method of producing a batch of a supported catalyst, comprising:
   introducing a first amount of a porous support material into a catalyst mix vessel;
   after introducing the first amount of the porous support material into the catalyst mix vessel, introducing a first amount of a dissolved catalyst solution into the catalyst mix vessel, the dissolved catalyst solution comprising a solvent and one or more catalyst compounds dissolved in the solvent;
   operating the catalyst mix vessel to contact the first amount of the dissolved catalyst solution with the first amount of the porous support material to form a first slurry comprising a first portion of the supported catalyst, the supported catalyst comprising active catalyst adhered to the porous support material;
   after operating the catalyst mix vessel to contact the first amount of the dissolved catalyst solution with the first amount of the porous support material, introducing a second amount of the dissolved catalyst solution into the catalyst mix vessel;
   after introducing the second amount of the dissolved catalyst solution into the catalyst mix vessel, introducing a second amount of the porous support material into the catalyst mix vessel;
   operating the catalyst mix vessel to contact the second amount of the dissolved catalyst solution with the second amount of the porous support material to form a second slurry comprising the batch of the supported catalyst, the batch of the supported catalyst comprising the first portion of the supported catalyst and a second portion of the supported catalyst; and
   discharging the batch of the supported catalyst from the catalyst mix vessel.

2. The method of claim 1, wherein the dissolved catalyst solution comprises a metallocene.

3. The method of claim 2, wherein the dissolved catalyst solution further comprises an activator comprising an alkylaluminoxane or modified alkylaluminoxane selected from the group consisting of methylaluminoxane, modified methylaluminoxane, ethylaluminoxane, isobutylaluminoxane, solid polymethylaluminoxane, and any combination thereof, and optionally,
   wherein the solvent is selected from the group consisting of a hydrocarbon, an aromatic hydrocarbon, a halogenated hydrocarbon, and any combination thereof.

4. The method of claim 1, wherein discharging the batch of the supported catalyst from the catalyst mix vessel is preceded by drying the supported catalyst within the catalyst mix vessel.

5. The method of claim 1, wherein the porous support material is selected from the group consisting of silica, glass, talc, clay, alumina, silica-alumina, silica-chromium, magnesium chloride, magnesia, titania, silica-titania, zirconia, iron oxide, boria, calcium oxide, zinc oxide, barium oxide, thoria, montmorillonite, phyllosilicate, aluminum phosphate gel, a polymer, and any combination thereof.

6. A method of producing a batch of a supported catalyst, comprising:
   introducing a first amount of a porous support material into a catalyst mix vessel;
   after introducing the first amount of the porous support material into the catalyst mix vessel, introducing a first amount of a dissolved catalyst solution into the catalyst mix vessel, the dissolved catalyst solution comprising a solvent and one or more catalyst compounds dissolved in the solvent;
   operating the catalyst mix vessel to contact the first amount of the dissolved catalyst solution with the first amount of the porous support material to form a first slurry comprising a first portion of the supported catalyst, the supported catalyst comprising active catalyst adhered to the porous support material;
   after operating the catalyst mix vessel to contact the first amount of the dissolved catalyst solution with the first amount of the porous support material, introducing a second amount of the porous support material into the catalyst mix vessel;
   after introducing the second amount of the porous support material into the catalyst mix vessel, introducing a second amount of the dissolved catalyst solution into the catalyst mix vessel;
   operating the catalyst mix vessel to contact the second amount of the dissolved catalyst solution with the second amount of the porous support material to form a second slurry comprising the batch of the supported catalyst, the batch of the supported catalyst comprising the first portion of the supported catalyst and a second portion of the supported catalyst; and
   discharging the batch of the supported catalyst from the catalyst mix vessel.

7. The method of claim 6, wherein the dissolved catalyst solution comprises a metallocene.

8. The method of claim 7, wherein the dissolved catalyst solution further comprises an activator comprising an alkylaluminoxane or modified alkylaluminoxane selected from the group consisting of methylaluminoxane, modified methylaluminoxane, ethylaluminoxane, isobutylaluminoxane, solid polymethylaluminoxane, and any combination thereof, and optionally,
   wherein the solvent is selected from the group consisting of a hydrocarbon, an aromatic hydrocarbon, a halogenated hydrocarbon, and any combination thereof.

9. The method of claim 6, wherein the porous support material is selected from the group consisting of silica, glass, talc, clay, alumina, silica-alumina, silica-chromium, magnesium chloride, magnesia, titania, silica-titania, zirconia, iron oxide, boria, calcium oxide, zinc oxide, barium oxide, thoria, montmorillonite, phyllosilicate, aluminum phosphate gel, a polymer, and any combination thereof.

10. A method of producing a batch of a supported catalyst, comprising:
   introducing a first amount of a dissolved catalyst solution into a catalyst mix vessel, the dissolved catalyst solution comprising a solvent and one or more catalyst compounds dissolved in the solvent;
   after introducing the first amount of the dissolved catalyst solution into the catalyst mix vessel, introducing a first amount of a porous support material into the catalyst mix vessel;
   operating the catalyst mix vessel to contact the first amount of the dissolved catalyst solution with the first amount of the porous support material to form a first slurry comprising a first portion of the supported catalyst, the supported catalyst comprising active catalyst adhered to the porous support material;
   after operating the catalyst mix vessel to contact the first amount of the dissolved catalyst solution with the first amount of the porous support material, introducing a second amount of the dissolved catalyst solution into the catalyst mix vessel;

after introducing the second amount of the dissolved catalyst solution into the catalyst mix vessel, introducing a second amount of the porous support material into the catalyst mix vessel;

operating the catalyst mix vessel to contact the second amount of the dissolved catalyst solution with the second amount of the porous support material to form a second slurry comprising the batch of the supported catalyst, the batch of supported catalyst comprising the first portion of the supported catalyst and a second portion of the supported catalyst; and discharging the batch of the supported catalyst from the catalyst mix vessel.

11. The method of claim 10, wherein the dissolved catalyst solution comprises a metallocene.

12. The method of claim 11, wherein the dissolved catalyst solution further comprises an activator selected from the group consisting an alkylaluminoxane and modified alkylaluminoxane, and optionally, wherein the alkylaluminoxane or modified alkylaluminoxane is selected from the group consisting of methylaluminoxane, modified methylaluminoxane, ethylaluminoxane, isobutylaluminoxane, solid polymethylaluminoxane, and any combination thereof.

13. The method of claim 10, wherein the solvent is selected from the group consisting of a hydrocarbon, an aromatic hydrocarbon, a halogenated hydrocarbon, and any combination thereof.

14. The method of claim 10, wherein discharging the batch of the supported catalyst from the catalyst mix vessel is preceded by drying the supported catalyst within the catalyst mix vessel.

15. The method of claim 10, wherein the porous support material is selected from the group consisting of silica, glass, talc, clay, alumina, silica-alumina, silica-chromium, magnesium chloride, magnesia, titania, silica-titania, zirconia, iron oxide, boria, calcium oxide, zinc oxide, barium oxide, thoria, montmorillonite, phyllosilicate, aluminum phosphate gel, a polymer, and any combination thereof.

16. A method of producing a batch of a supported catalyst, comprising:

introducing a first amount of a dissolved catalyst solution into a catalyst mix vessel, the dissolved catalyst solution comprising a solvent and one or more catalyst compounds dissolved in the solvent;

after introducing the first amount of the dissolved catalyst solution into the catalyst mix vessel, introducing a first amount of a porous support material into the catalyst mix vessel;

operating the catalyst mix vessel to contact the first amount of the dissolved catalyst solution with the first amount of the porous support material to form a first slurry comprising a first portion of the supported catalyst, the supported catalyst comprising active catalyst adhered to the porous support material;

after operating the catalyst mix vessel to contact the first amount of the dissolved catalyst solution with the first amount of the porous support material, introducing a second amount of the porous support material into the catalyst mix vessel;

after introducing the second amount of the porous support material into the catalyst mix vessel, introducing a second amount of the dissolved catalyst solution into the catalyst mix vessel;

operating the catalyst mix vessel to contact the second amount of the dissolved catalyst solution with the second amount of the porous support material to form a second slurry comprising the batch of the supported catalyst, the batch of supported catalyst comprising the first portion of the supported catalyst and a second portion of the supported catalyst; and discharging the batch of the supported catalyst from the catalyst mix vessel.

17. The method of claim 16, wherein the dissolved catalyst solution comprises a metallocene.

18. The method of claim 17, wherein the dissolved catalyst solution further comprises an activator selected from the group consisting an alkylaluminoxane and modified alkylaluminoxane, and optionally, wherein the alkylaluminoxane or modified alkylaluminoxane is selected from the group consisting of methylaluminoxane, modified methylaluminoxane, ethylaluminoxane, isobutylaluminoxane, solid polymethylaluminoxane, and any combination thereof.

19. The method of claim 16, wherein the solvent is selected from the group consisting of a hydrocarbon, an aromatic hydrocarbon, a halogenated hydrocarbon, and any combination thereof.

20. The method of claim 16, wherein discharging the batch of the supported catalyst from the catalyst mix vessel is preceded by drying the supported catalyst within the catalyst mix vessel.

* * * * *